(12) United States Patent
Yang et al.

(10) Patent No.: US 10,454,777 B2
(45) Date of Patent: Oct. 22, 2019

(54) NETWORK DATA PROCESSING DRIVER FOR A COGNITIVE ARTIFICAL INTELLIGENCE SYSTEM

(71) Applicant: OMNI AI, INC., Houston, TX (US)

(72) Inventors: Tao Yang, Katy, TX (US); Ming-Jung Seow, Richmond, TX (US)

(73) Assignee: Omni AI, Inc., Dallas, TX (US)

( * ) Notice: Subject to any disclaimer, the term of this patent is extended or adjusted under 35 U.S.C. 154(b) by 0 days.

(21) Appl. No.: 15/481,320

(22) Filed: Apr. 6, 2017

(65) Prior Publication Data

US 2017/0295070 A1 Oct. 12, 2017

Related U.S. Application Data

(60) Provisional application No. 62/319,068, filed on Apr. 6, 2016.

(51) Int. Cl.
| | |
|---|---|
| *H04L 12/24* | (2006.01) |
| *H04L 29/08* | (2006.01) |
| *G06N 20/00* | (2019.01) |
| *H04L 12/26* | (2006.01) |

(52) U.S. Cl.
CPC ........... *H04L 41/142* (2013.01); *G06N 20/00* (2019.01); *H04L 41/12* (2013.01); *H04L 41/16* (2013.01); *H04L 43/04* (2013.01); *H04L 67/10* (2013.01)

(58) Field of Classification Search
CPC ....... H04L 41/12; H04L 41/142; H04L 67/10; H04L 41/16; H04L 43/04; G06N 99/005; G06N 20/00
See application file for complete search history.

(56) References Cited

U.S. PATENT DOCUMENTS

| | | | | |
|---|---|---|---|---|
| 5,768,552 | A * | 6/1998 | Jacoby | G06T 11/206 345/418 |
| 7,016,313 | B1 * | 3/2006 | Harper | H04L 45/02 370/254 |
| 9,961,574 | B1 * | 5/2018 | Tubi | H04L 43/065 |
| 2006/0123477 | A1 * | 6/2006 | Raghavan | G06F 9/546 726/22 |
| 2015/0047040 | A1 * | 2/2015 | Cobb | G06F 17/2785 726/23 |
| 2015/0172203 | A1 * | 6/2015 | DeCusatis | H04L 47/70 709/226 |
| 2015/0326532 | A1 * | 11/2015 | Grant | H04L 63/0218 726/1 |
| 2015/0333992 | A1 * | 11/2015 | Vasseur | H04L 12/4633 370/252 |
| 2017/0012838 | A1 * | 1/2017 | Kashtan | G06F 8/73 |
| 2017/0244607 | A1 * | 8/2017 | Dujodwala | H04L 41/0896 |

* cited by examiner

*Primary Examiner* — Gil H. Lee

(57) ABSTRACT

Techniques are disclosed for processing data collected from network components for analysis by a machine learning engine of a Cognitive AI System. A network data processing driver receives a stream of data from a data collector which obtains data from one or more network data sources. The driver normalizes the stream of data to one or more feature values each corresponding to the network data sources and generates a sample vector from the feature values. The sample vector is formatted to be analyzed by the machine learning engine.

11 Claims, 2 Drawing Sheets

NETWORK DATA PROCESSING DRIVER FOR A COGNITIVE ARTIFICAL INTELLIGENCE SYSTEM

CROSS-REFERENCE TO RELATED APPLICATIONS

This application claims the priority benefit, under 35 U.S.C. § 119(e), of U.S. Application No. 62/319,068, entitled "Network Data Processing Drivers for Behavioral Recognition System," filed on Apr. 6, 2016, the disclosure of which is incorporated herein by reference in its entirety.

TECHNICAL FIELD

One or more embodiments of the present disclosure generally relate to network data processing drivers for processing network data. More specifically, one or more embodiments presented herein provide techniques for processing data collected from network components for analysis by a Cognitive AI System.

BACKGROUND

A computer network allows interconnected computing systems to communicate with one another. One example of a computer network may include multiple computing nodes connected via a number of network devices (e.g., switches routers, etc.). Further, the computer network may include an intrusion detection system (IDS) that monitors network or system activity for malicious activities or violations within the network and produces reports to a management console. Generally, an IDS is signature-based, i.e., the IDS may be configured with signatures to detect malicious or unwanted activity. As known, an attack signature is a sequence of computer activities (or alterations to those activities) corresponding to a known attack, e.g., towards a vulnerability in an operating system or application.

For example, an IDS may be configured with an attack signature that detects a particular virus in an e-mail message. The signature may contain information about subject field text included in previous e-mails that have contained the virus or attachment filenames in the past. With the signature, the IDS can compare the subject of each e-mail with subjects contained in the signature and also attachments with known suspicious filenames. However, a signature based approach raises several concerns. For example, although an IDS may possibly detect alterations to a particular attack, the alterations typically need to be defined in the signature to do so. Similarly, because attack signatures are predefined, the IDS is susceptible to new attacks that have not yet been observed, e.g., 0-day attacks.

SUMMARY

One embodiment relates to a computer-implemented method to generate a logical network topology for a network. The method includes receiving a stream of data from a data collector within the network. The stream of data is obtained from a data source within the network. The method also includes normalizing the stream of data to extract one or more feature values. The feature value is associated with the data source. The method also includes generating statistics by tracking patterns associated with the feature value. The feature value may change over time with new stream of data received from the data collector. Additionally, the method includes generating the logical network topology based on the statistics, generating a context-aware description of network activity based at least in part on a mapping of the feature value in the logical network topology, and sending a signal representing the context-aware description of the network activity. The signal represents an anomaly in the network activity.

Other embodiments include, without limitation, a non-transitory computer-readable medium that includes instructions that enable a processing unit to implement one or more aspects of the disclosed methods as well as a system having a processor, memory, and application programs configured to implement one or more aspects of the disclosed methods.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent upon examination of the following drawings and detailed description. It is intended that all such additional systems, processes, and features be included within this description, be within the scope of the disclosed subject matter, and be protected by the accompanying claims.

BRIEF DESCRIPTION OF THE DRAWINGS

The drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
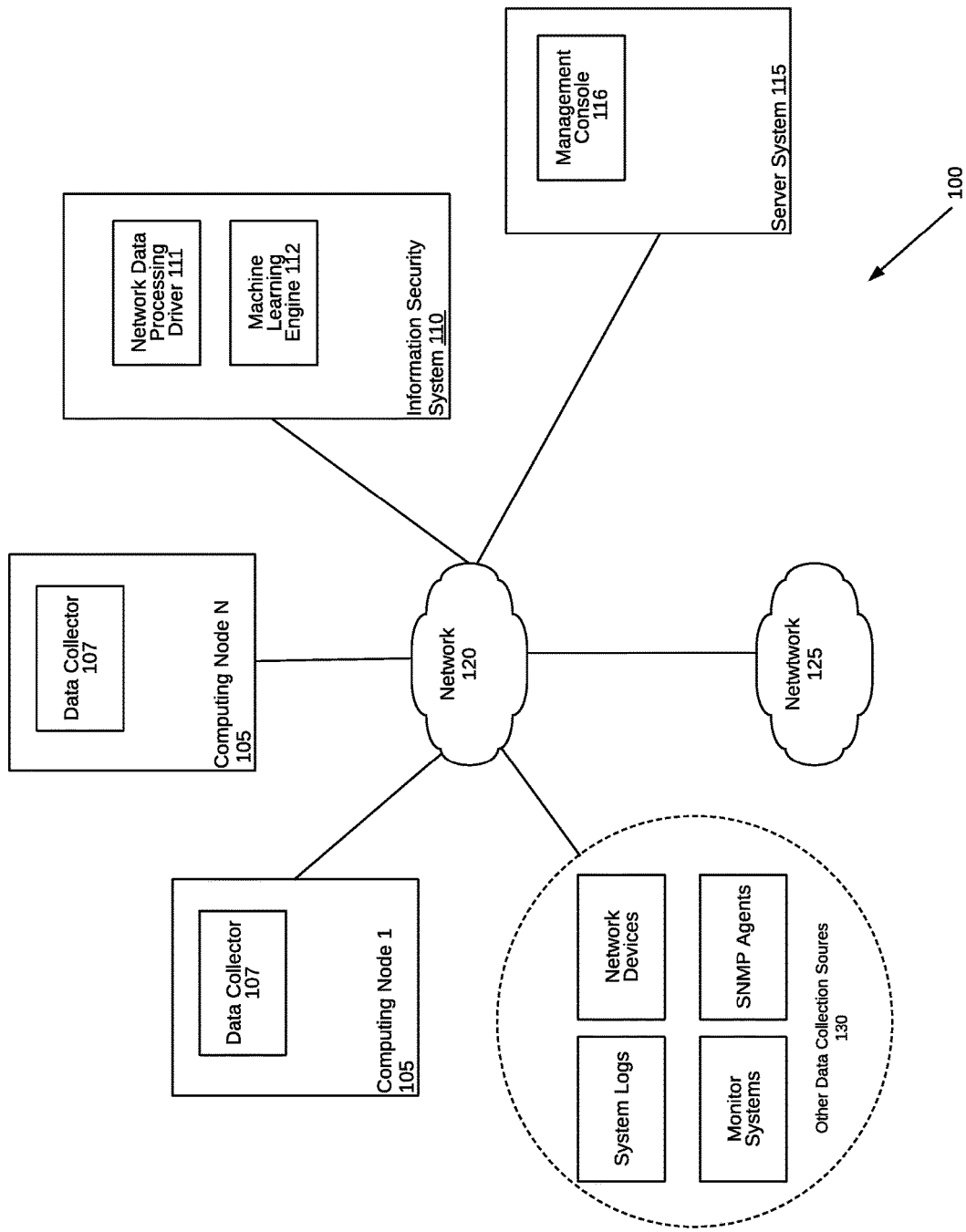
FIG. 1 illustrates an example computing environment, according to one embodiment.

Embodiments presented herein disclose techniques for processing data obtained from network components (e.g., nodes in a computer network, household appliances configured to communicate with one another, etc.). In particular, the techniques provide a network data processing driver that receives such network data from one or more data collectors and encodes the data for machine learning by a Cognitive AI System or a behavioral recognition system.

For example, an information security system that includes a machine learning engine that uses a neuro-linguistic model to learn patterns of activity or behavior based on network activity may be situated in the computer network. The machine learning engine analyzes the network activity (e.g., network data streams) to identify recurring behavioral patterns. The machine learning engine learns normal activity occurring over the computer network based on various data collectors executing in (and outside) the information security system. As a result, the machine learning may detect network activity that is abnormal based on what has been observed as normal activity, without needing to rely on predefined attack signatures.

In one embodiment, one or more data collectors may obtain streams of data from multiple sources and forward the information to a network data processing driver executing in the information security system. For example, a given data collector may be configured to retrieve packet data passing through the computing network. The data collector may also obtain string data from the intrusion detection monitor logs. The data collector may send the packet data and/or data in other formats (e.g., string data, text data) to the network data processing driver.

In turn, the network data processing driver formats the streams of data to be readable by the machine learning engine for analysis. To do so, the network data processing driver may parse the streams of data and identify feature values in the data. For example, the network data processing data driver may evaluate the packet header obtained by a data collector and extract information such as source and destination MAC addresses, network addresses, data payload, and the like. Further, the network data processing driver may divide each of the information into several components. For instance, the driver may separate an IP address identified in the packet into multiple components. For instance, an IP address that is either 32 bit (IPv4) or 128 bit (IPv6) may be split into multiple parts evenly. Each of these parts may be normalized into feature values having a value between 0 and 1 inclusively. For example, IP address 128.82.21.40 may be split into 128, 82, 21, and 40 where each component is represented by 8 bits encoding. The driver may then convert the IP address components to feature values and normalize the feature values to a value, e.g., between 0 and 1, inclusive. The network data processing driver may then send the normalized data to the machine learning engine. As stated, the machine learning engine learns patterns of activity from the normalized data to distinguish between normal activity and abnormal activity. If abnormal activity is detected, the machine learning engine may generate anomaly data to be presented to the user by the network data processing driver. Advantageously, the machine learning engine is able to detect anomalies without pre-defined attack definitions and the like.

In addition to anomalies detected by the machine learning engine, the network data processing driver may detect anomalies in received data streams based on sets of rules. In some cases, an attack to a network may be easily recognizable as an attack, e.g., a distributed denial of service (DDoS) attack to a particular node, MAC address spoofing, etc. Rather than wait for the machine learning engine to learn the pattern as an attack, the network data processing driver may immediately recognize and handle the attack based on a set of pre-defined rules without and/or before involving the machine learning engine. In some instances, the information security system may include a processor that determines whether the anomalies are to be detected by the machine learning engine or the network processing driver. In some instances, the machine learning engine and/or the network processing driver determines whether the machine leaning engine or the network processing driver might analyze and/or handle the attack. Advantageously, detecting anomalies via the network data processing driver and/or via the machine learning provides a more flexible adaptive approach towards detecting malicious attacks or other irregularities on the computer network.

Further, in one embodiment, the network data processing driver continuously maintains statistics of data based on the identified features. The statistics may track each of the features for different network components (e.g., network devices, computing nodes, etc.) over various intervals of time, e.g., over minutes, hours, days, weeks, and so on. Further, the network data processing driver may identify patterns based on the statistics and observed feature data, e.g., which nodes communicate with which nodes, at what time do those nodes communicate with one another, how much data do those nodes send per communication at a given time, and/or the like. The network data processing driver may generate a logical network topology by mapping those patterns to corresponding nodes in the network.

In one embodiment, the logical network topology may provide context-aware descriptions of network activity, which in turn provides a user with more meaningful descriptions when the information security system sends an alert or special event notification. For example, the network data processing driver may provide mappings of identifiers and feature values to corresponding network components. Such as, the mappings of identifiers and features to corresponding network components and activities may be provided in data collector modules of the network data processing driver. The mappings allow the network data processing driver to translate the alert data to reference the corresponding network components. Once translated, the network data processing driver may further generate context-aware descriptions associated with each of the network component in the alert data. For example, a context-aware description may provide the user with information alerting on "TCP traffic of four megabytes at time 16:27:33 on Jun. 3, 2015 between node <IP=192.168.2.33, MAC=00:3e:e1:c5:3e:c3, port=50250> and node <IP=192.168.4.60, MAC=00:A0:C9:14:C4:29, port=50250>." In addition, the network data processing driver applies the logical network topology to the translated alert to provide further context. For example, the network data processing driver may generate further descriptions regarding typical traffic patterns associated with one of the nodes specified in the alert.

Note, the following uses a computer network connecting computing nodes and networking devices with one another as a reference example for a network processing data driver that monitors and processes streams of data collected from a variety of sources in the computer network. However, embodiments may be adapted to other configurations where one or more devices are networked together. For example, embodiments may be adapted to an Internet-of-Things configuration, where one or more household appliances (e.g., light switches, doors) are configured to transmit network data to a hub. A data collector may obtain the network data and format the data to be analyzed by the machine learning engine.

FIG. 1 illustrates a computing environment 100, according to one embodiment. As shown, computing environment 100 includes one or more computing nodes 1-N 105, an information security system 110, a server system 115, and networks 120 and 125. The network 120 may represent an intranet interconnecting the computing nodes, for example, computing node 1 to computing node N (collectively, computing nodes 105), information security system 110, and server system 115 with one another via various networking devices (e.g., switches, routers, etc.). For example, the network 120 and interconnected components may represent an enterprise network, where computing nodes 105 are physical client devices and virtual computing instances. Further, the network 120 may connect to the network 125, which can represent the Internet (thus allowing a given computing node to communicate with other computing systems outside the enterprise network).

The information security system 110 includes an network data processing driver 111 and a machine learning engine 112. The server system 115 includes a management console 116. The information security system 110 is a neuro-linguistic Cognitive AI System that learns patterns of network activity observed within the computing devices connected to network 120. Doing so allows the information security system 110 to distinguish normal activity and anomalous activity within the network 120.

As further described below, the network data processing driver 111 obtains data from a variety of computer nodes 105 and other data collection sources 130 connected via network 120. For example, the other data collection sources 130 include network devices, system logs, data from monitor systems (e.g., intrusion detection systems), and—data collection sources 130 can include system logs, network devices, packet traffic, datagram traffic, trap data, and the like. To do so, data collector modules executing in, e.g., computing nodes 105 (as data collector 107) may be configured to obtain the data, format the data (e.g., using some standardized format, such as JSON), and send the formatted data to the network data processing driver 111. In some instances, data collector modules may be executing in network devices.

For instance, the network data processing driver 111 may receive raw packet data associated with incoming and outgoing packet traffic, such as source addresses, destination addresses, etc. Other examples may include information related to disk mounts and physical accesses at a given node. For instance, if an individual inserts a flash drive into a Universal Serial Bus (USB) port of a computing node or mounts an external hard disk drive to the system, the network data processing driver 111 may receive a stream of data associated with the event (e.g., as raw numbers and identifiers associated with the flash drive, USB port, etc.). The network data processing driver 111 extracts feature values from each individual data stream and formats the feature values to be readable to the machine learning engine 112.

The machine learning engine 112 receives samples of feature value data for learning and analysis. The machine learning engine 112 learns, based on the samples, patterns of activity occurring within the network 120. Over time, the machine learning engine 112 is able to determine normal activity within the network 120, which in turn allows the machine learning engine 112 to detect anomalous activity in real-time based on the learned patterns. Once detected, the machine learning engine 112 may generate raw anomaly data and send the raw anomaly data to the network data processing driver 111, which in turn generates an alert based on the raw anomaly data. The network data processing driver 111 may then send the alert to the management console 116. In turn, the management console 116 may present the alert via a user interface that a user, (e.g., a network administrator using management console 116) may view and evaluate.

In general, the raw anomaly data sent by the machine learning engine 112 to the network data processing driver 111 may be strings of low-level feature descriptors and values. Say that the low-level features description is sent directly to the network administrator. Even if the network administrator was able to discern what the low-level features and values correspond to in the network 120, the administrator may have difficulty ascertaining why the alert was generated. To provide more meaningful alerts to a user, in one embodiment, the network data processing driver 111 may build a logical network topology based on the observed network activity. The logical network topology includes observed network traffic attributes mapped to nodes 105 and network devices (e.g., physical and virtual switches, routers, and the like). To do so, the network data processing driver 111 monitors network activity and tracks patterns related to network traffic attributes in the monitored activity.

For instance, network traffic attributes may include connectivity patterns, e.g., where the network data processing driver 111 observes instances of a given node A communicating with a node B, and a node C at a different observed rate. Network traffic attributes may also include intensity patterns that measure a pattern of traffic volume, e.g., amount of data being sent to/from a given node in the network. Another example of a network traffic attribute that the network data processing driver 111 may track is a frequency pattern, e.g., a pattern at which a node exchanges data in both directions. Further, network traffic attributes may include information regarding the patterns, e.g., the type of protocol used, source and destination addresses, etc. The network data processing driver 111 may associate the observed network traffic attributes with a corresponding node or network device. Further still, over time, the network data processing driver 111 continuously updates the logical network topology as the network processing driver 111 observes additional data. Doing so allows the network data processing driver 111 to provide a more robust context describing the enterprise network (e.g., to a network administrator) beyond using a physical network topology to describe which devices are connected to one another.

As stated, the machine learning engine may report raw anomaly data to the network data processing driver 111. The raw anomaly data can include an anomaly identifier, identifiers of features having abnormal activity, values for those features, timestamp data, and/or the like. As further described below, the network data processing driver 111 may generate a human-readable alert by translating the feature data provided in the raw anomaly data to corresponding network components (e.g., whether a feature corresponds to a network device ID, protocol name, etc.). Further, the network data processing driver 111 generates additional contextual information related to the anomaly based on data provided by the logical network topology.

For example, the machine learning engine 112 may generate an anomaly related to a given node A receiving Internet Control Message Protocol (ICMP) packets from a node D. The logical network topology may indicate that node A does not normally communicate with node D during that period of time that the packets were sent. The logical network topology might also indicate that when node A and node D communicate, node D typically sends Transmission Control Protocol (TCP)/ Internet Protocol (IP) packets. The context information generated by the network data processing driver 111 may describe these indications. The network data processing driver 111 then sends the alert to the management console 116, which in turn presents the alert to the user. Advantageously, the alert provides a meaningful description that allows the user to better evaluate how to proceed further.

Figure 2:
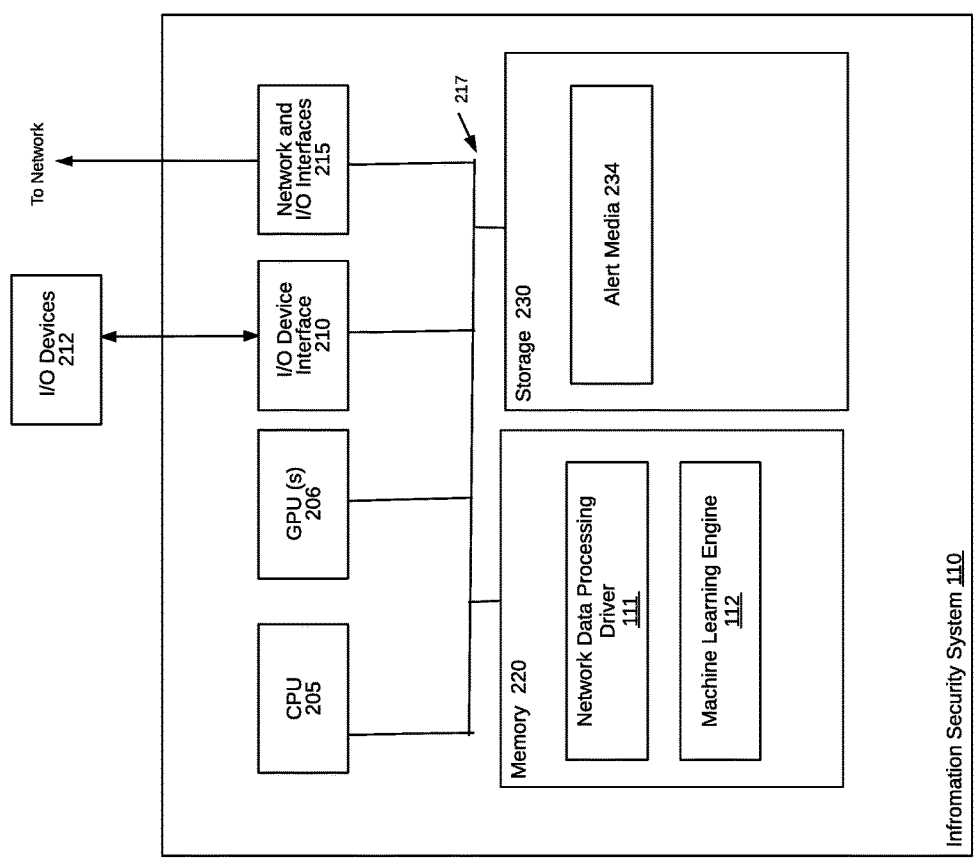
FIG. 2 illustrates an example computing system configured to process data collected from a variety of computing resources, according to one embodiment.

FIG. 2 further illustrates the information security system 110, according to one embodiment. As shown, the information security system 110 includes, without limitation, a central processing unit (CPU) 205, a graphics processing unit (GPU) 206, a network interface 215, a memory 220, and storage 230, each connected to an interconnect bus 217. The information security system 110 may also include an I/O device interface 210 connecting I/O devices 212 (e.g., keyboard, display and mouse devices) to the information security system 110. Further, in context of this disclosure, the computing elements shown in information security system 110 may correspond to a physical computing system. In one implementation, the information security system 110 is representative of a neuro-linguistic Cognitive AI System configured to detect anomalous activity in a computer network.

The CPU 205 retrieves and executes programming instructions stored in memory 220 as well as stores and retrieves application data residing in the memory 220. The interconnect bus 217 is used to transmit programming instructions and application data between the CPU 205, I/O devices interface 210, storage 230, network interface 215, and memory 220.

Note, CPU 205 is included to be representative of a single CPU, multiple CPUs, a single CPU having multiple processing cores, and/or the like. The memory 220 is generally included to be representative of a random access memory. The storage 230 may be a disk drive storage device. Although shown as a single unit, the storage 230 may be a combination of fixed and/or removable storage devices, such as fixed disc drives, removable memory cards, optical storage, network attached storage (NAS), or a storage area-network (SAN).

In one implementation, the GPU 206 is a specialized integrated circuit designed to accelerate graphics in a frame buffer intended for output to a display. GPUs are efficient at manipulating computer graphics and are generally more effective than general-purpose CPUs for algorithms where processing of large blocks of data is done in parallel. Applications executing in the information security system 110 use the parallel processing capabilities of the GPU 206 to improve performance in handling large amounts of incoming data (e.g., network activity data) during each pipeline processing phase.

The memory 220 includes the network data processing driver 111 and the machine learning engine 112. The storage 230 includes alert media 234. As discussed above, the network data processing driver 111 monitors network activity and processes observed packets to extract feature data that is sent to the machine learning engine 112 for analysis. The machine learning engine 112 performs neuro-linguistic analysis on values (e.g., feature data) that are output by the network data processing driver 111 and learns patterns from the values. The machine learning engine 112 distinguishes between normal and abnormal patterns of activity and generates alerts (e.g., using an alert media 234) based on observed abnormal activity.

In one embodiment, the network data processing driver 111 maintains statistics for each of the feature values over time. Further, the network data processing driver 111 generates the logical network topology based on the statistics and feature values observed in the network activity. For example, the network data processing driver 111 identifies patterns of the traffic flow, e.g., patterns of nodes communicating with other nodes at a given time, patterns of frequency at which nodes send a given amount of data to other nodes, and the like. The network data processing driver 111 may then map the network traffic attributes to a given node or network device (e.g., routers, switches, etc.) within the network.

In one embodiment, the machine learning engine 112 generates anomaly data when detecting abnormal network activity. The anomaly data is raw data that includes a string of features and corresponding values representing the observed abnormal network activity. The network data processing driver 111 receives the anomaly data from the machine learning engine 112 for display to a user, e.g., via a user interface on a management console. In one embodiment, prior to presenting the anomaly data to the user, the network data processing driver 111 via the alert media 234 generates a human-readable description of the anomaly data as well as contextual information provided by the logical network topology. To generate human-readable description, the network data processing driver 111 may translate the anomaly data to the human-readable description based on mappings used in translating network data to raw data for the machine learning engine 112. Further, the network data processing driver 111 may correlate network components identified in the raw anomaly data with network traffic attributes (e.g., patterns) specified in the logical network topology. For example, the network data processing driver 111 may include contextual information describing a computing node or device specified in the anomaly (e.g., a traffic pattern normally observed for that node or device).

In some instances, the network data processing driver 111 may detect anomalies independent of and in addition to the machine learning engine 112. To do so, the network data processing driver 111 may evaluate monitored network activity against a set of anomaly detection rules. Doing so allows the network data processing driver 111 to quickly identify well-established attacks on a network, e.g., ICMP flood attacks, network address spoofing, and the like.

In the preceding, reference is made to embodiments of the present disclosure. However, the present disclosure is not limited to specific described embodiments. Instead, any combination of the following features and elements, whether related to different embodiments or not, is contemplated to implement and practice the techniques presented herein.

Furthermore, although embodiments of the present disclosure may achieve advantages over other possible solutions and/or over the prior art, whether or not a particular advantage is achieved by a given embodiment is not limiting of the present disclosure. Thus, the following aspects, features, embodiments and advantages are merely illustrative and are not considered elements or limitations of the appended claims except where explicitly recited in a claim(s).

Aspects presented herein may be embodied as a system, method or computer program product. Accordingly, aspects of the present disclosure may take the form of an entirely hardware embodiment, an entirely software embodiment (including firmware, resident software, micro-code, etc.) implemented in hardware, or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures.

For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments presented herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Embodiments presented herein describe techniques for generating a logical network topology and providing contextual information based on the logical network topology relative to anomalous behavior in a computer network. Advantageously, identifying network traffic attributes (e.g., patterns of network activity) and mapping those attributes to components in the computer network provide a more detailed context related to the interaction of nodes and network devices in the computer network, beyond a physical network topology configuration. Further, by including contextual information relating to network components involved in an anomaly, a resulting alert may provide more meaningful information that a user (e.g., a network administrator, information security operator, etc.) can better review.

While the foregoing is directed to embodiments of the present disclosure, other and further embodiments may be devised without departing from the basic scope thereof, and the scope thereof is determined by the claims that follow.

CONCLUSION

Further, it should be appreciated that a computing system (e.g., information security system 110 in FIG. 1 and FIG. 2) may be embodied in any of a number of forms, such as a rack-mounted computer, a desktop computer, a laptop computer, or a tablet computer. Additionally, a computing system may be embedded in a device not generally regarded as a computer but with suitable processing capabilities, including a Personal Digital Assistant (PDA), a smart phone or any other suitable portable or fixed electronic device.

Also, a computing system may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing system may receive input information through speech recognition or in other audible format.

Such computing systems may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

Also, various disclosed concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A computer-implemented method to generate a logical network topology for a network, the method comprising:
   receiving a first stream of data from a data collector within a network, the first stream of data obtained from a data source within the network;
   identifying a packet header from the first stream of data and extracting address information from the packet header;
   separating the extracted address information into multiple components and converting the separated address information components to feature values;
   normalizing the feature values, the feature values associated with the data source;
   generating, via a neuro-linguistic model, patterns associated with the normalized feature values and related to network traffic attributes;
   generating statistics from the patterns;
   generating a logical network topology based on the generated statistics;
   generating a context-aware description of network activity based at least in part on a mapping of the normalized feature values in the logical network topology to corresponding network components;
   detecting an anomaly in the network activity based on the patterns, wherein the anomaly is associated with a network attack;
   generating an alert signal in response to detecting the anomaly, the alert signal representing a context-aware description of the anomaly; and
   sending the alert signal.

2. The computer-implemented method of claim 1, wherein the address information includes at least one of:
   source Media Access Control (MAC) address;
   destination MAC address;
   network address; and
   data payload.

3. The computer-implemented method of claim 1, wherein at least one of the feature values includes a value between 0 and 1.

4. The computer-implemented method of claim 1, further comprising:
   receiving a second stream of data from the data collector; and
   updating the logical network topology based on the second stream of data.

5. The computer-implemented method of claim 4, wherein updating the logical network topology includes:
   extracting at least one feature value of the feature values from the second stream of data;
   updating, via the neuro-linguistic model, patterns associated with the extracted at least one feature value; and
   updating the statistics based on the updated patterns associated with the extracted at least one feature value.

6. The computer-implemented method of claim 1, further comprising:
   generating connectivity patterns representing network traffic attributes for the network.

7. The computer-implemented method of claim 1, further comprising:
   converting the alert signal representing the anomaly to human-readable description of the anomaly data.

8. The computer-implemented method of claim 1, further comprising:
   determining whether to analyze the network attack.

9. The computer-implemented method of claim 1, wherein the network attack is one of: a distributed denial of service (DDoS) attack, an Internet Control Message Protocol (ICMP) flood attack, or network address spoofing.

10. The computer-implemented method of claim 1, further comprising:
    learning, via a machine learning engine, an association between at least one of the patterns and the network attack; and
    analyzing the anomaly to determine that the anomaly is associated with the network attack.

11. The computer-implemented method of claim 10, wherein the network attack is one of: a DDoS attack, an ICMP flood attack, or network address spoofing.

* * * * *